(12) United States Patent
Huelke

(10) Patent No.: US 8,899,671 B2
(45) Date of Patent: Dec. 2, 2014

(54) VEHICLE HEADLINER ATTACHMENT SYSTEM

(71) Applicant: Ford Global Technologies, LLC, Dearborn, MI (US)

(72) Inventor: David Huelke, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/830,760

(22) Filed: Mar. 14, 2013

(65) Prior Publication Data

US 2014/0265456 A1    Sep. 18, 2014

(51) Int. Cl.
*B60R 13/02*    (2006.01)

(52) U.S. Cl.
CPC .................................. *B60R 13/0231* (2013.01)
USPC ......................................................... 296/214

(58) Field of Classification Search
CPC    B60R 13/02; B60R 13/0206; B60R 13/0212; B60R 13/0231; B60R 21/04; B60R 2011/0028; B60R 2013/02; B60R 2021/04; B60R 2021/0042
USPC ................. 296/214, 216.06–216.08
See application file for complete search history.

(56) References Cited

U.S. PATENT DOCUMENTS

| | | | |
|---|---|---|---|
| 4,810,147 A * | 3/1989 | Hirohata | 411/349 |
| 6,647,594 B1 * | 11/2003 | Deb et al. | 16/410 |
| 7,441,833 B1 | 10/2008 | Pomeroy et al. | |
| 7,677,653 B2 * | 3/2010 | Brown et al. | 296/214 |
| 7,905,542 B2 | 3/2011 | Marx et al. | |
| 8,002,340 B2 | 8/2011 | Lee | |
| 8,398,161 B2 * | 3/2013 | Kirchen et al. | 296/214 |
| 2007/0046054 A1 * | 3/2007 | Hinman et al. | 296/1.07 |
| 2012/0014766 A1 | 1/2012 | Kirchen et al. | |

FOREIGN PATENT DOCUMENTS

| | | | |
|---|---|---|---|
| KR | 20050031559 | | 4/2005 |
| KR | 20080043546 | | 5/2008 |
| WO | WO0206071 | * | 1/2002 |

OTHER PUBLICATIONS

Mathew, Boney A., Printed Sep. 28, 2012. "Method of Assembling a Vehicle & Integrated Composite Roof Module Technology-Paradigm Shift in Automotive Vehicle Assembly," Mathson Industries, Inc., http://www.speautomotive.com/SPEA_CD/SPEA2006/PDF/f/f4.pdf.

* cited by examiner

*Primary Examiner* — Dennis H Pedder
(74) *Attorney, Agent, or Firm* — Vichit Chea; Price Heneveld LLP

(57) ABSTRACT

A vehicle headliner attachment system includes a moonroof assembly having a peripheral structure surrounding at least one glass panel. A headliner has an upper surface surrounding an opening that aligns with at least one glass panel. A select one of a plurality of carriers and a pair of longitudinal rails protrudes down from laterally opposing sides of the peripheral structure. The other of the plurality of carriers and the pair of longitudinal rails coupled with the upper surface of the headliner proximate the opening. The plurality of connectors each have a connector slidably engaged with a select one of the pair of longitudinal rails and a resilient element biasing carrier away from the select one of the pair of longitudinal rails.

19 Claims, 8 Drawing Sheets

VEHICLE HEADLINER ATTACHMENT SYSTEM

FIELD OF THE INVENTION

The present invention generally relates to a system for attaching a trim component to a vehicle body structure, and more particularly for attaching a headliner to a moonroof assembly.

BACKGROUND OF THE INVENTION

It is common for vehicles to have a number of headers that are supported by various pillar structures. The headers are typically included to support a roof structure, which in some instances may include a moonroof assembly. The headliner is commonly attached to an interior side of the roof structure surrounding the moonroof assembly to provide an attractive appearance for the interior of the vehicle. Headliners have been attached around moonroof assemblies in a variety of manners, including magnets and hook and loop type fasteners, such as Velcro. These manners of attachment are substantially hidden from view, which commonly causes difficulties in manufacturing, as the headliner must be vertically suspended by the assembler to align the fasteners. Further, once the fasteners are attached, they provide little to no movement to allow for adjusting the position of the headliner to attach additional fasteners.

SUMMARY OF THE INVENTION

According to one aspect of the present invention, a vehicle headliner attachment system includes a headliner having an upper surface. A moonroof assembly has at least one glass panel surrounded by a structure that includes a downward protruding rail. A plurality of carriers is coupled with the upper surface. Each carrier has a connection feature protruding upward to slidably engage the rail and to bias the headliner away from the moonroof assembly.

According to another aspect of the present invention, a headliner attachment system for a vehicle roof includes a moonroof assembly coupled with the vehicle roof. The moonroof assembly has a peripheral structure that includes a longitudinal rail protruding downward. A headliner has an upper surface surrounding an opening. A linear arrangement of carriers is coupled with the upper surface proximate the opening. Each carrier has a connector engaging the rail and a resilient element biasing the headliner downward.

According to yet another aspect of the present invention, a vehicle headliner attachment system, includes a moonroof assembly having a peripheral structure surrounding at least one glass panel. A headliner has an upper surface surrounding an opening that aligns with the at least one glass panel. A select one of a plurality of carriers and a pair of longitudinal rails protrudes down from laterally opposing sides of the peripheral structure. The other of the plurality of carriers and the pair of longitudinal rails is coupled with the upper surface of the headliner proximate the opening. The plurality of connectors each have a connector slidably engaged with a select one of the pair of longitudinal rails and a resilient element biasing the carrier away from the select one of the pair of longitudinal rails.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
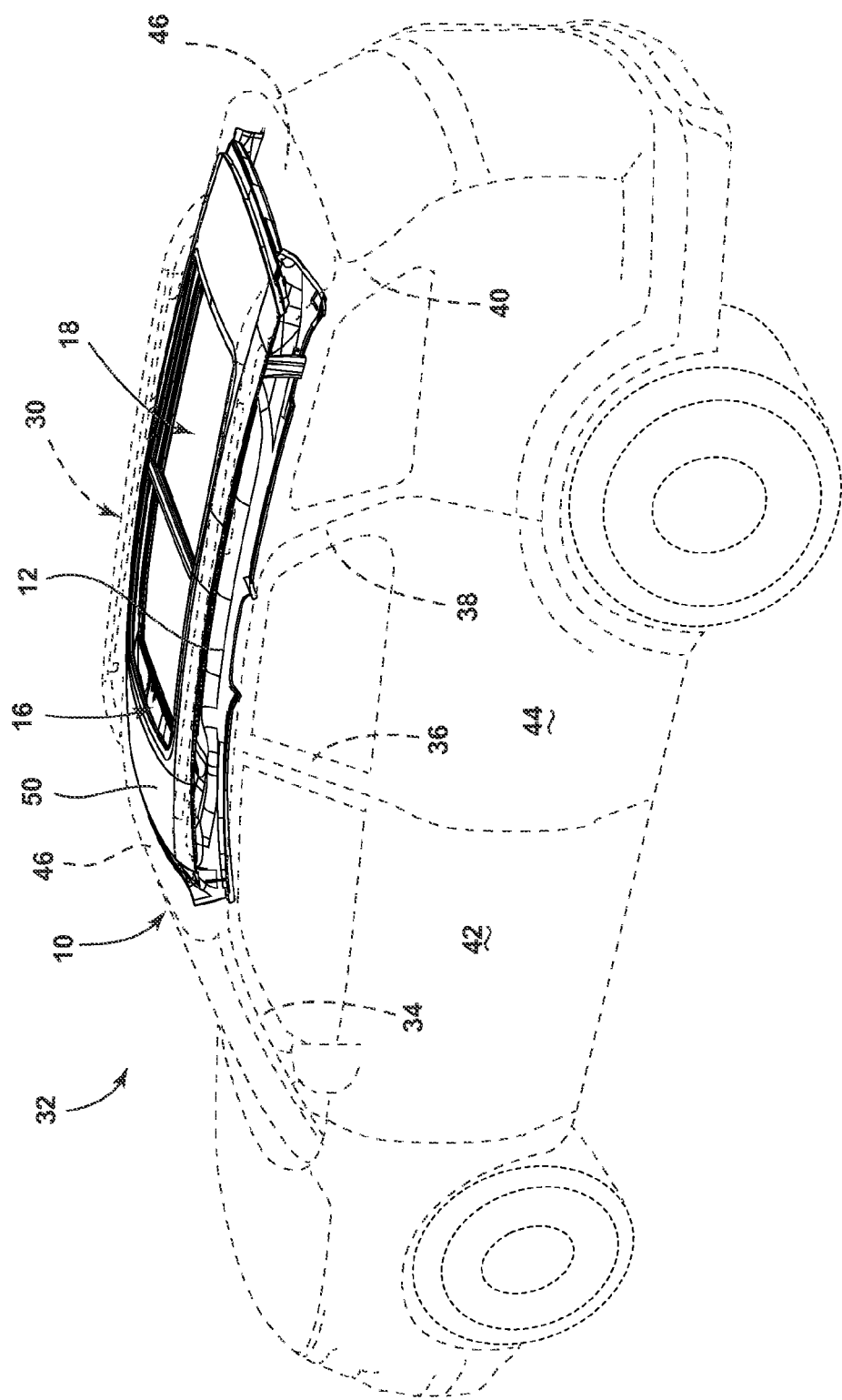
FIG. 1 is a top perspective view of a vehicle having a headliner attachment system, according to one embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-10, reference numeral 10 generally designates a vehicle headliner attachment system that includes a headliner 12 having an upper surface 14. A moonroof assembly 16 has at least one glass panel 18 surrounded by a structure 20 that includes a downward protruding rail 22. A plurality of carriers 24 is coupled with the upper surface 14. Each carrier 24 has a connection feature 26 protruding upward to slidably engage the rail 22 and to bias the headliner 12 away from the moonroof assembly 16.

Referring now to FIG. 1, one embodiment of the headliner attachment system 10 is included as part of a roof 30 of a vehicle 32. The roof 30 is supported by various pillars, including an A-pillar 34, a B-pillar 36, a C-pillar 38, and a D-pillar 40. A front door 42 is defined between the A-pillar 34 and the B-pillar 36, and a rear door 44 is defined between the B-pillar 36 and the C-pillar 38. The opposing side of the vehicle 32 similarly includes a corresponding arrangement of pillars that support the opposing side of the roof 30. A header 46 extends between the A-pillars 34 and the D-pillars 40 to support the front and rear portions of the roof 30, respectively. It is contemplated that various alternative pillar arrangements may support the vehicle roof 30 having the headliner 12 attachment of the present invention. Accordingly, the vehicle 32 may conceivably include alternative vehicle types, such as cars, trucks, boats, and other conceivable vehicles as generally understood by one having ordinary skill in the art.

Figure 2:
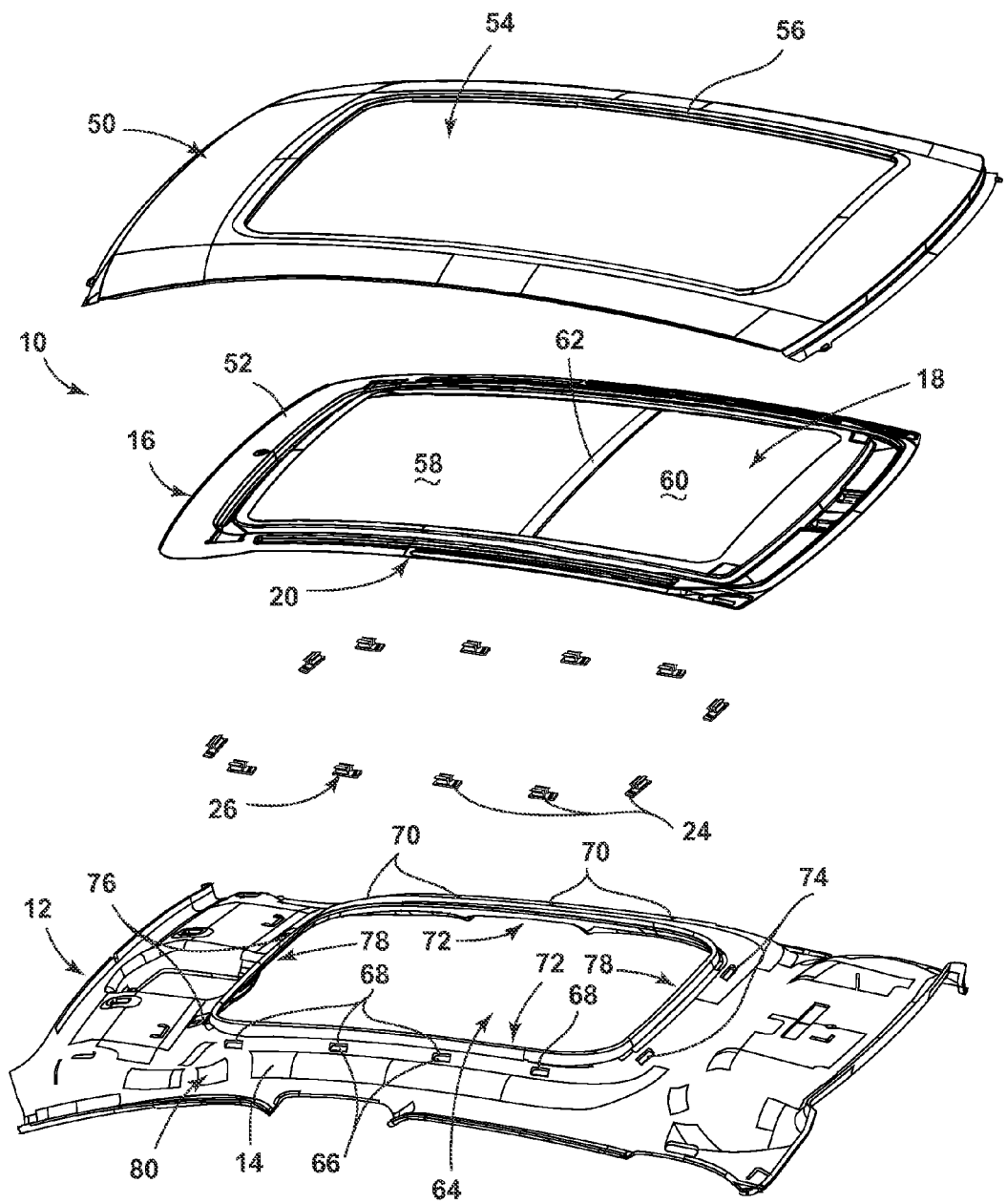
FIG. 2 is an exploded top perspective view of the headliner attachment system.

As shown in FIG. 2, the roof 30 of the vehicle 32 includes a roof panel 50 that engages a top surface 52 of the moonroof assembly 16. The roof panel 50 is formed to have a central aperture 54 that includes a rim 56 that borders the glass panels 18 of the moonroof assembly 16, concealing the peripheral structure 20 of the moonroof assembly 16. In the illustrated embodiment, the moonroof assembly 16 includes a forward glass panel 58 and a rearward glass panel 60. The forward and rearward glass panels 58, 60 engage along a seal 62 that extends laterally across a central portion of the moonroof assembly 16. It is contemplated that the forward glass panel 58 may raise away from the seal 62 and slide rearwardly over the rearward glass panel 60. It is also conceivable that additional glass panels may be included and alternative glass panel sliding configurations may be employed within the scope of the headliner attachment system 10.

As further illustrated in FIG. 2, the headliner 12 is shown to include an upper surface 14 that surrounds an opening 64. The opening 64 is formed to align with the glass panels 18 of the moonroof assembly 16, such that the headliner 12 conceals the peripheral structure 20 of the moonroof assembly 16 from view within the interior of the vehicle 32. The upper surface 14 of the headliner 12 includes a number of attachment points 66 for receiving and connecting the carriers 24. The connection points are spaced around the opening 64, and include a first longitudinal row 68 and a second longitudinal row 70 on opposing lateral sides 72 of the opening 64. The connection points further include a rear row 74 and a forward row 76 on opposing longitudinal sides 78 of the opening 64. The first and second rows 68, 70 each include four connection points generally evenly spaced in a linear arrangement between an edge portion 80 of the headliner 12 and the opening 64. The forward and rearward rows 76, 74 each include two connection points in a linear arrangement and spaced proximate the lateral sides 72 of the opening 64 generally the same distance away from the opening 64 as the first and second rows 68, 70. It is conceivable that the first and second rows 68, 70 and the forward and rearward rows 76, 74 may include additional or fewer connection points to receive and engage additional carriers 24. It is also conceivable that the connection points may be alternatively arranged around a periphery of the opening 64 having various shapes and configurations.

Figure 3:
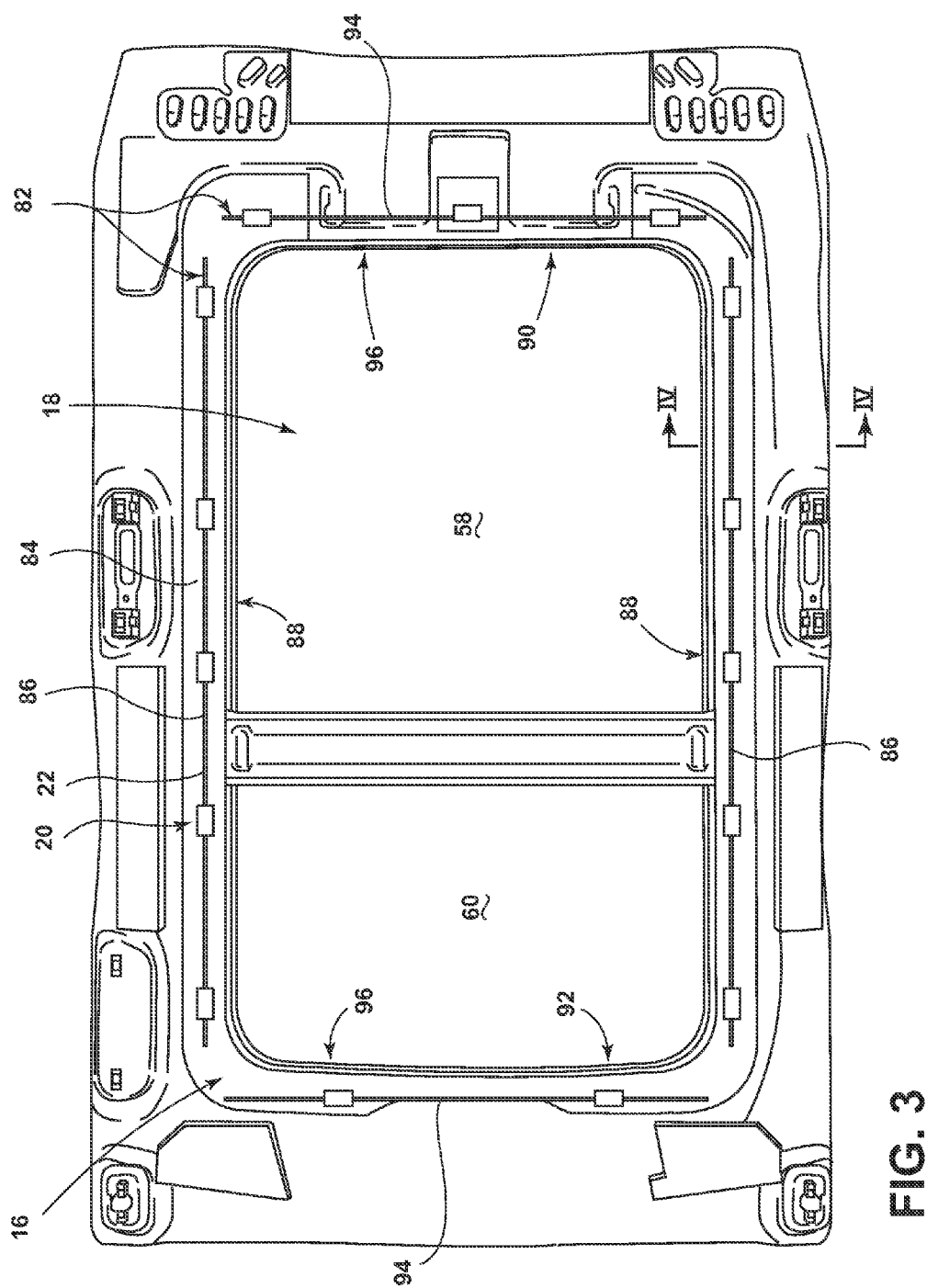
FIG. 3 is a bottom plan view of a moonroof assembly of the headliner attachment system.

As shown in FIG. 3, the moonroof assembly 16 includes the peripheral structure 20 surrounding the forward and rearward glass panels 58, 60. The peripheral structure 20 includes a rail arrangement 82 protruding from an interior surface 84 of the peripheral structure 20. The rail arrangement 82 includes a pair of longitudinal rail sections 86 positioned in parallel alignment on opposing lateral edges 88 of the glass panels 18. The longitudinal rail sections 86 extend linearly from a forward end 90 of the forward glass panel 58 and a rearward end 92 of a rearward glass panel 60. Similarly, the peripheral structure 20 includes a pair of lateral rail sections 94 arranged in parallel alignment on opposing longitudinal edges 96 of the glass panels 58, 60. The lateral rail sections 94 also linearly extend generally between the lateral edges 88 of the glass panel, proximate the longitudinal rail sections 86. It is conceivable that the longitudinal and lateral rail sections 86, 94 may have a general curvature in the Z-axis direction, correlating with the general curvature of the roof 30 of the vehicle 32. It is also conceivable that the longitudinal rail sections 86 may be segmented to individual portions that align with each carrier 24 attached to the headliner 12. Further, the longitudinal or lateral rail sections 86, 94 may be replaced with an alternative attachment feature configured to engage the carrier 24.

Figure 4:
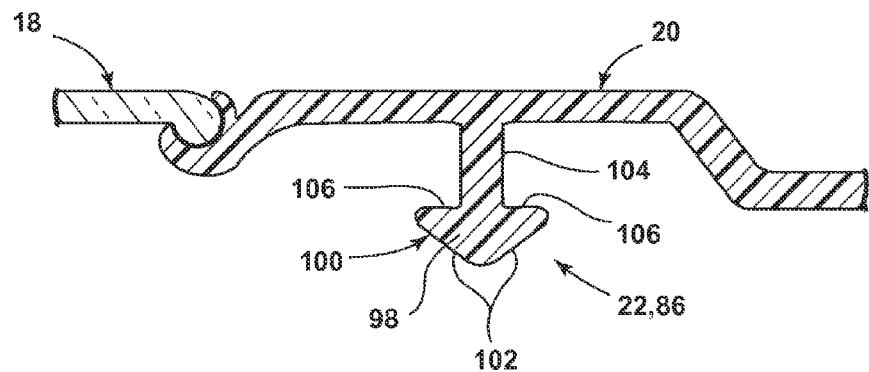
FIG. 4 is a cross sectional view of the moonroof assembly, taken at line IV-IV of FIG. 3.

As shown in FIG. 4, one of the longitudinal rail sections 86 is shown as a cross section having a bulbous portion 98 positioned at a distal end 100 of the rail. The bulbous portion 98 is formed to include angled surfaces 102 defining a generally pointed tip proximate the distal end 100. A stem portion 104 of the rail that extends from the peripheral structure 20 to the bulbous portion 98 has a thickness that is less than the thickness of the bulbous portion 98. Between the stem portion 104 and the angled surfaces 102 resides a retention surface 106 extending generally orthogonally from the stem portion 104 of the rail in alignment with the surface of the peripheral structure proximate the stem portion 104. It is conceivable that the bulbous portion 98 may be alternatively formed to form a cross sectional shape such as a circular shape, ovular shape, or other conceivable shapes having thickness greater than the stem portion 104, such that the bulbous portion 98 acts to vertically retain the carrier 24 upon engagement therewith. The illustrated embodiment of the bulbous portion 98 on the segment of the longitudinal rail 86 extends continuously along the longitudinal rail and similarly is included upon the lateral rail sections 94.

Figure 5:
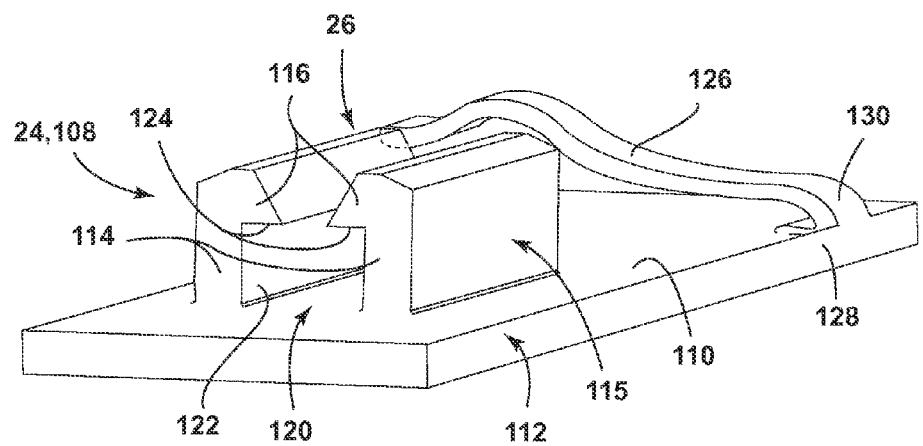
FIG. 5 is a top perspective view of a carrier of the headliner attachment system.
Figure 6:
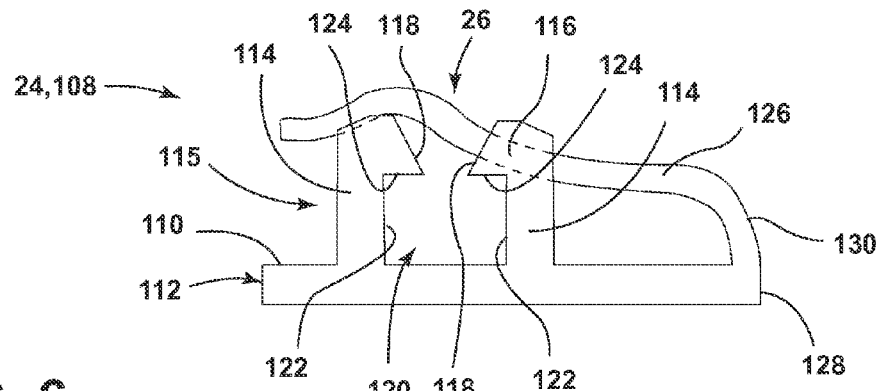
FIG. 6 is a side elevational view of the carrier.

Referring now to FIGS. 5-6, a carrier 108 of the plurality of carriers 24 spaced around and engaged with the headliner 12 is illustrated in one embodiment. The carrier 108 generally includes a connection feature 26 protruding from an upper surface 110 of a base portion 112 of the carrier 108. In the illustrated embodiment, the connection feature includes a pair of flexible members 114, together referred to as a connector 115, that extend upward and include inward protruding retention elements 116 configured to engage opposing sides of either the lateral or longitudinal rail section 86, 94 and to retain the bulbous portion 98. The flexible members 114 include a ramped surface 118 that angles inward toward the opposing flexible member 114 and is configured to receive the angled surface 102 of the bulbous portion 98. The flexible members 114 are each generally rectangular protrusions that are arranged in parallel alignment on the base portion 112 to define a channel 120 between the flexible members 114. Accordingly, the channel 120 is defined by the upper surface 110 of the base portion 112, interior walls 122 of the flexible members 114, and a 124 of the inward protruding retention elements 116. The holding surfaces 124 are generally aligned with the upper surface 110 of the base portion 112 and are configured to frictionally engage the retention surfaces 106 of the bulbous portion 98.

As further illustrated in FIGS. 5-6, the connection feature 26 includes a resilient element 126 extending upward from the upper surface 110 of the base portion 112 that is configured to bias the headliner 12 away from the moonroof assembly 16 for reducing frictional noise between the carrier 108 and the moonroof assembly 16 such as rattling noises. In the illustrated embodiment, the resilient element 126 extends angularly from an edge 128 of the base portion 112 and spans across the upper surface 110 of the base portion 112. The resilient element 126 is formed to include a rigid connection 130 proximate the base portion 112 to provide a spring biased feature. It is contemplated that the connection feature 26 may embody alternative orientations and configurations to slidably engage a rail. Also, although the carrier 24 in the illustrated embodiment is made of a polymer material for its light weight and flexibility, it is conceivable that the carrier may be made of other materials having similar characteristics.

Figure 7:
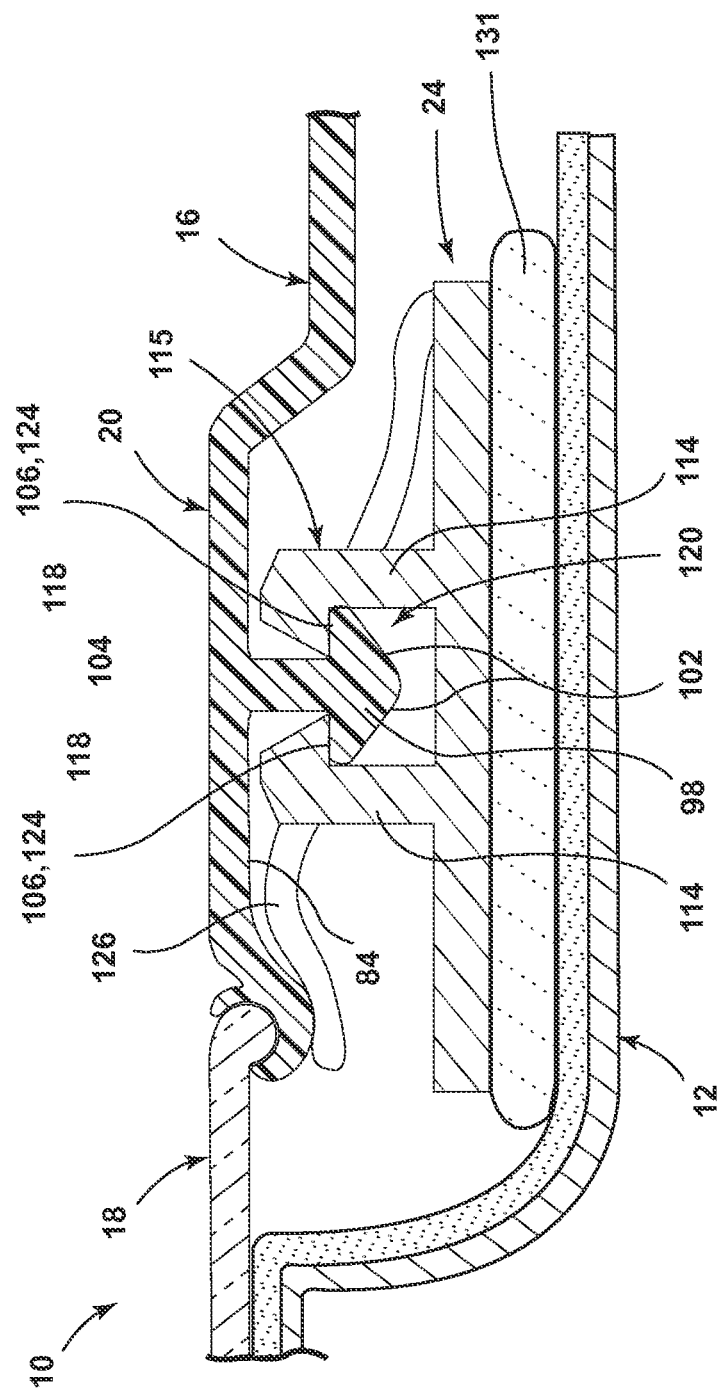
FIG. 7 is a cross sectional view of the headliner attachment system, taken along line VII-VII of FIG. 1.

As illustrated in FIG. 7, the headliner attachment system 10 is assembled, such that the headliner 12 is engaged with the moonroof assembly 16 about the carrier 24. To achieve engagement, the carrier 24 is first attached to the headliner 12 with adhesive, tape, or other conceivable attachment arrangement 131. The headliner 12 along with the attached carrier 24 is then pushed upward allowing the flexible members 114 to engage the bulbous portion 98, whereby the angle of the surface of the bulbous portion 98 slides along the ramped surface 118 of the flexible members 114 causing the flexible members 114 to elastically deform outward and to allow the bulbous portion 98 to be received within the channel 120 of the connector 115. Upon inserting the bulbous portion 98 into the channel 120, the retention surface 106 of the bulbous portion 98 engage the holding surfaces 124 of the flexible members 114 to prevent the headliner 12 from disengaging from the moonroof assembly 16.

In addition, as illustrated in FIG. 7, the resilient element 126 abuts the interior surface 84 of the peripheral structure 20 to bias the headliner 12 away from the moonroof 16 and provide a force that maintains the retention surface 106 and the holding surface 124 in frictional contact.

Upon assembly, the longitudinal rail sections 86 are engaged by the first and second rows of carriers 24 in a similar engagement as shown in FIG. 7. Upon this engagement the headliner 12 is allowed to slide longitudinally with respect to the moonroof 16. More specifically, the carriers 24 slide on the longitudinal rail sections 86, maintaining the bulbous portion 98 within the channel 120 of the carriers 24. The longitudinal sliding movement of the headliner 12 allows the opening 64 in the headliner 12 to be aligned with the forward and rearward glass panels 58, 60 of the moonroof assembly 16 without the need of an assembler supporting the headliner 12 in the A-axis or vertical direction. Once the opening 64 in the headliner 12 and the forward and rearward glass panels 58, 60 are aligned, the lateral rail sections 94 are engaged with the forward and rearward rows 76, 74 of carriers 24, respectively.

Figure 8:
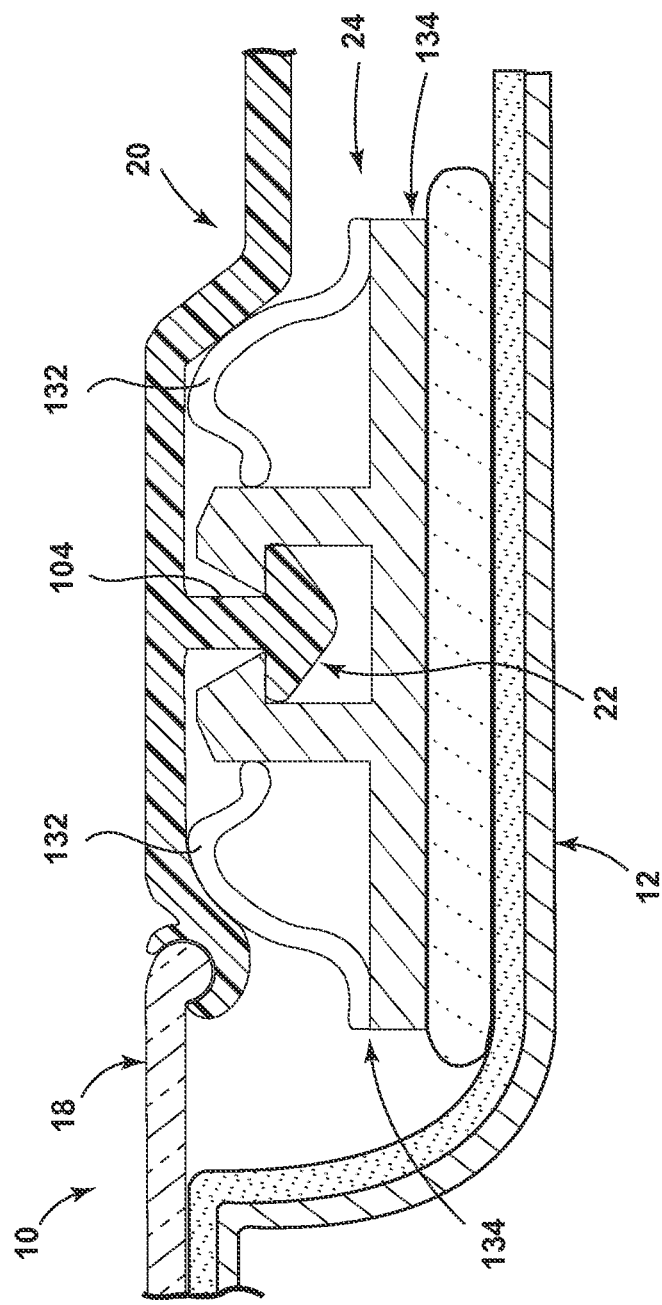
FIG. 8 is a cross sectional side view of an additional embodiment of the headliner attachment system.
Figure 9:
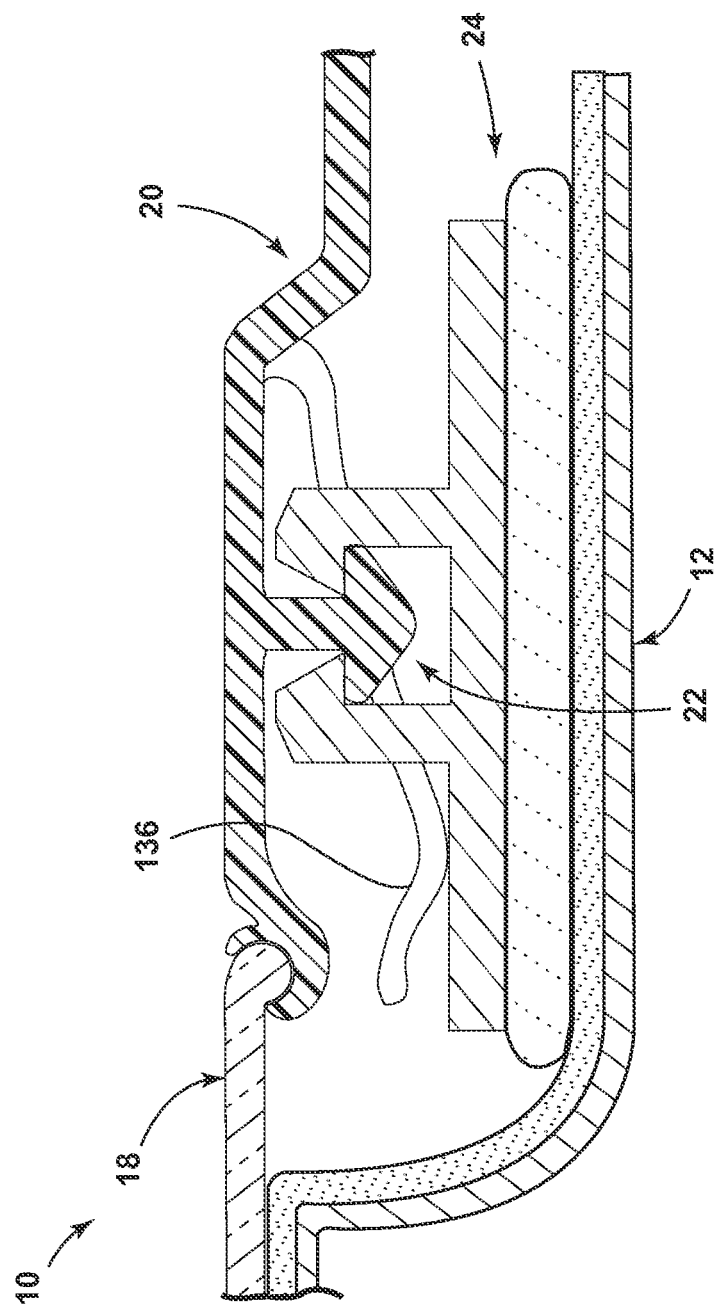
FIG. 9 is a cross sectional side view of an additional embodiment of the headliner attachment system.
Figure 10:
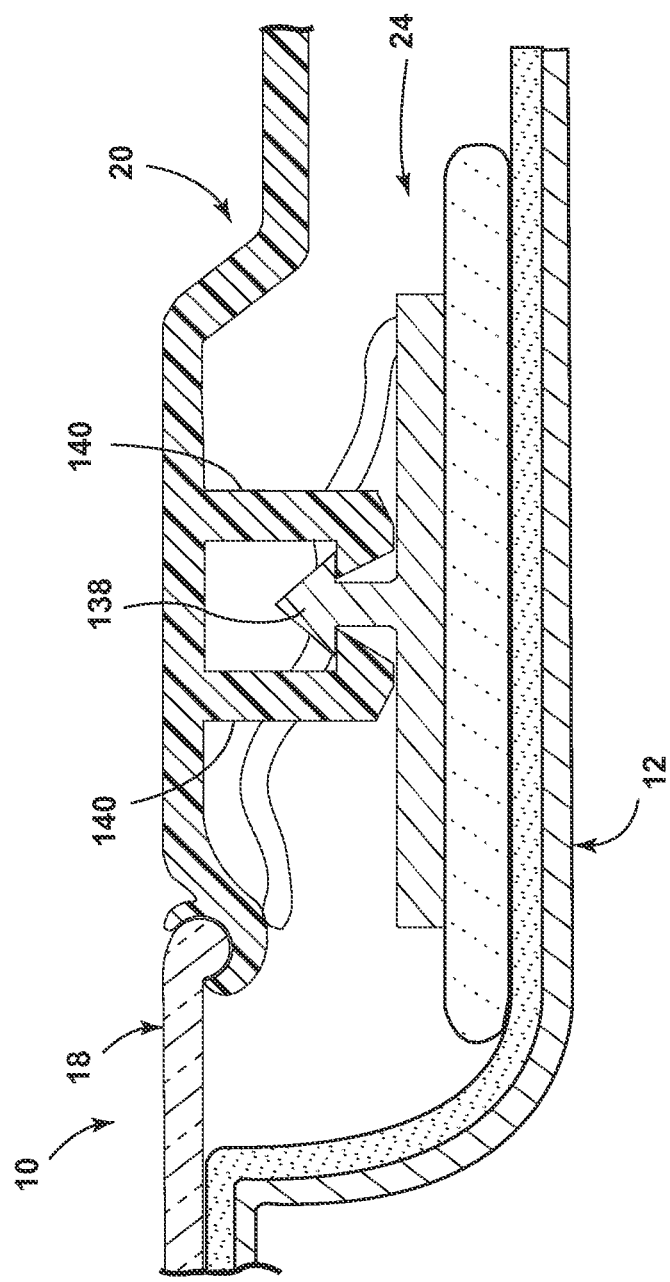
FIG. 10 is a cross sectional side view of an additional embodiment of the headliner attachment system.

Additional embodiments of the headliner attachment system 10 are illustrated in FIGS. 8-10. For instance, as shown in FIG. 8, the carrier includes two retention elements 132 protruding from opposing edges 134 of the base portion to engage the peripheral structure on corresponding sides of the rail 22. In this embodiment the resilient elements 132 do not cross the rail 22 or engage the rail 22 allowing the carrier to extend along a greater section of the headliner, such as along the two-thirds of the longitudinal rail section 86. These resilient elements 132 may also be a continuous piece extending along the longitudinal rail with the flexible members. In another embodiment shown in FIG. 9, the resilient element 136 protrudes from the peripheral structure of the moonroof assembly to contact the base portion of the carrier providing similar biasing and rattle prevention function. The additional embodiment of FIG. 10 includes the rail 138 employed on the carrier 24 and the flexible members 140 included on the moonroof assembly. In such an embodiment, the rail 138 may extend along the opening in the headliner 12 or alternatively the flexible members 140 may continuously extend in place of the longitudinal rail sections 86, as shown in FIG. 3. It is also contemplated that any combination of the additional embodiments shown in FIGS. 8-10 may be combined with the embodiment illustrated in FIGS. 1-7 and described above.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

I claim:

1. A vehicle headliner attachment system, comprising:
    a headliner having an upper surface;
    a moonroof assembly having an exterior peripheral structure with a downward protruding rail; and
    a plurality of carriers coupled with the upper surface and each having a connection feature with inward protruding retention elements that slidably engage opposing sides of the rail and retain a bulbous portion of the rail and a resilient element that protrudes upward to bias the headliner downward.

2. The vehicle headliner attachment system of claim 1, wherein the downward protruding rail extends linearly along a side of a glass panel of the moonroof assembly.

3. The vehicle headliner attachment system of claim 1, wherein the resilient element abuts the exterior peripheral structure of the rail to bias the headliner downward for preventing upward movement of the headliner relative to the rail.

4. The vehicle headliner attachment system of claim 1, wherein the rail includes a pair of longitudinal sections arranged in parallel alignment on opposing lateral edges of at least one glass panel of the moonroof assembly.

5. The vehicle headliner attachment system of claim 4, wherein the plurality of carriers includes a pair of linear arrangements positioned on opposing sides of an opening in the headliner and that engage the pair of longitudinal sections for sliding the headliner longitudinally on the rails to align the opening with the at least one glass panel.

6. The vehicle headliner attachment system of claim 5, wherein the plurality of carriers includes at least one carrier positioned on a forward side or a rearward side of the opening for engaging the structure of the moonroof assembly when the opening is aligned with the at least one glass panel.

7. A headliner attachment system for a vehicle roof, comprising:
a moonroof assembly coupled with the vehicle roof and having an exterior peripheral structure that includes a longitudinal rail protruding downward;
a headliner having an upper surface surrounding an opening; and
a linear arrangement of carriers coupled with the upper surface and each having a pair of connectors slidably engaging opposing sides of an enlarged end of the rail and a resilient element protruding upward to abut the moonroof assembly.

8. The headliner attachment system of claim 7, wherein a distal end of the longitudinal rail includes a bulbous portion that is fictionally engaged by the pair of connectors.

9. The headliner attachment system of claim 8, wherein the pair of connectors are flexible members that have inward protruding retention elements that engage opposing sides of the longitudinal rail and retain the bulbous portion.

10. The headliner attachment system of claim 7, wherein each carrier includes a base portion and the pair of connectors extend from the base portion to couple with opposing sides of the longitudinal rail.

11. The headliner attachment system of claim 10, wherein the resilient element extends upward from the base portion to contact the peripheral structure and bias the headliner downward to prevent the headliner from moving upward relative to the rail.

12. The headliner attachment system of claim 7, wherein the moonroof assembly includes at least one glass panel coupled with the peripheral structure, and wherein the longitudinal rail includes a pair of parallel sections arranged on opposing lateral edges of the at least one glass panel.

13. The headliner attachment system of claim 12, wherein the linear arrangement of carriers includes a pair of linear segments on opposing sides of the opening and coupled with the pair of parallel sections for slidably aligning the opening with the at least one glass panel.

14. A vehicle headliner attachment system, comprising:
a moonroof assembly having an exterior peripheral structure surrounding at least one glass panel;
a headliner having an upper surface surrounding an opening that aligns with the at least one glass panel; and
a pair of longitudinal rails protruding down from laterally opposing sides of the peripheral structure; and
a plurality of carriers coupled with the upper surface of the headliner proximate the opening and each having a connection feature with inward protruding retention elements slidably engaged with opposing sides of one of the pair of longitudinal rails and retaining a bulbous portion of the rail and a resilient element biasing the carrier away from the peripheral structure.

15. The vehicle headliner attachment system of claim 14, wherein a distal end of the longitudinal rails includes the bulbous portion that is fictionally engaged by the inward protruding retention elements of the connector.

16. The vehicle headliner attachment system of claim 15, wherein the connection features include a base portion and a pair of flexible members extending from the base portion to engage opposing sides of the select one of the pair of longitudinal rails and retain the bulbous portion.

17. The vehicle headliner attachment system of claim 16, wherein the resilient element extends upward from the base portion of the connection feature to contact the peripheral structure and bias the headliner downward to prevent the flexible members from rattling.

18. The vehicle headliner attachment system of claim 17, wherein the plurality of carriers includes a pair of linear arrangements positioned on opposing lateral sides of the opening for sliding the headliner on the longitudinal rails to align the opening with the at least one glass panel.

19. The vehicle headliner attachment system of claim 18, wherein the plurality of carriers includes at least one carrier positioned on at least one of the opposing longitudinal sides of the opening for engaging the peripheral structure when the opening is aligned with the at least one glass panel.

\* \* \* \* \*